(12) United States Patent
Haskamp et al.

(10) Patent No.: US 10,252,595 B2
(45) Date of Patent: Apr. 9, 2019

(54) MECHANICAL COMPONENT HAVING A FORCE SENSOR

(71) Applicant: ZF Friedrichshafen AG, Friedrichshafen (DE)

(72) Inventors: Klaus Haskamp, Dinklage (DE); Michael Klank, Osnabrück (DE); Julian Stratmann, Melle (DE); Jens Vortmeyer, Preussisch Oldendorf (DE); Andreas Hartmann, Höltinghausen (DE); Christoph Schwinge, Loeningen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 6 days.

(21) Appl. No.: 15/527,786

(22) PCT Filed: Oct. 19, 2015

(86) PCT No.: PCT/EP2015/074085
§ 371 (c)(1),
(2) Date: May 18, 2017

(87) PCT Pub. No.: WO2016/078844
PCT Pub. Date: May 26, 2016

(65) Prior Publication Data
US 2018/0251001 A1    Sep. 6, 2018

(30) Foreign Application Priority Data

Nov. 20, 2014 (DE) .......... 10 2014 223 654

(51) Int. Cl.
*G01L 5/00* (2006.01)
*B60G 17/019* (2006.01)
*B60G 7/00* (2006.01)

(52) U.S. Cl.
CPC ....... *B60G 17/01941* (2013.01); *B60G 7/005* (2013.01); *B60G 17/019* (2013.01);
(Continued)

(58) Field of Classification Search
CPC ........ B60G 2204/416; B60G 17/01941; B60G 7/005; B60G 2204/1162; G01L 5/0004
(Continued)

(56) References Cited

U.S. PATENT DOCUMENTS 7,278,324 B2    10/2007    Smits et al.
7,357,036 B2     4/2008    Steprath
(Continued)

FOREIGN PATENT DOCUMENTS

DE    35 34 711 A1    4/1987
DE    36 30 749 A1    3/1988
(Continued)

OTHER PUBLICATIONS

US 5,422,089 A1, 07/2002, Madden et al. (withdrawn)
(Continued)

*Primary Examiner* — Max H Noori
(74) *Attorney, Agent, or Firm* — Davis & Bujold PLLC; Michael J. Bujold

(57) ABSTRACT

A mechanical component for a vehicle, having a measurement region with a surface, and at least one force sensor associated with the measurement region for detecting a force to which the component is exposed. The component (3) has, disposed in the measurement region, a hollow body (3b) with a cavity (4) in which the at least one force sensor (7) can be positioned.

14 Claims, 2 Drawing Sheets

(52) U.S. Cl.
CPC .... *G01L 5/0004* (2013.01); *B60G 2204/1162* (2013.01); *B60G 2204/416* (2013.01)

(58) Field of Classification Search
USPC .......................................................... 73/774
See application file for complete search history.

(56) References Cited

U.S. PATENT DOCUMENTS

| | | | |
|---|---|---|---|
| 7,730,547 | B2 | 6/2010 | Barrera et al. |
| 7,895,908 | B2 | 3/2011 | Fujiwara et al. |
| 9,249,820 | B2 * | 2/2016 | Groche .................. B21K 25/00 |
| 9,708,057 | B2 * | 7/2017 | Birchette ................ B64C 25/58 |
| 10,035,399 | B2 * | 7/2018 | Haskamp ............. B60G 17/019 |
| 2004/0187607 | A1 * | 9/2004 | Kilmartin ............ B60G 17/019 |
| | | | 73/862.333 |
| 2007/0035148 | A1 * | 2/2007 | Ellenrieder ............ B62D 21/15 |
| | | | 296/35.1 |
| 2012/0292871 | A1 | 11/2012 | Wittmann et al. |
| 2013/0031987 | A1 | 2/2013 | Beauvais et al. |
| 2013/0104665 | A1 | 5/2013 | Biris et al. |
| 2013/0118267 | A1 | 5/2013 | Suzuki et al. |
| 2013/0312535 | A1 | 11/2013 | Dunleavy et al. |
| 2015/0006054 | A1 | 1/2015 | Hofmann et al. |

FOREIGN PATENT DOCUMENTS

| | | |
|---|---|---|
| DE | 10 2005 005 354 A1 | 8/2006 |
| DE | 10 2011 117 519 A1 | 5/2013 |
| DE | 10 2011 089 605 A1 | 6/2013 |
| DE | 10 2012 005 614 A1 | 9/2013 |
| DE | 10 2013 213 672 A1 | 1/2015 |
| EP | 2 524 827 A1 | 11/2012 |
| EP | 2 589 503 A1 | 5/2013 |
| GB | 2246864 A | 2/1992 |
| WO | 2004-065926 A1 | 8/2004 |
| WO | 2011/065921 A1 | 6/2011 |

OTHER PUBLICATIONS

German Search Report Corresponding to 10 2014 223 657.6 dated Sep. 14, 2015.
German Search Report Corresponding to 10 2014 223 654.1 dated Sep. 14, 2015.
International Search Report Corresponding to PCT/EP2015/074086 dated Jan. 13, 2016.
International Search Report Corresponding to PCT/EP2015/074085 dated Jan. 13, 2016.
Written Opinion Corresponding to PCT/EP2015/074086 dated Jan. 13, 2016.
Written Opinion Corresponding to PCT/EP2015/074085 dated Jan. 13, 2016.

* cited by examiner

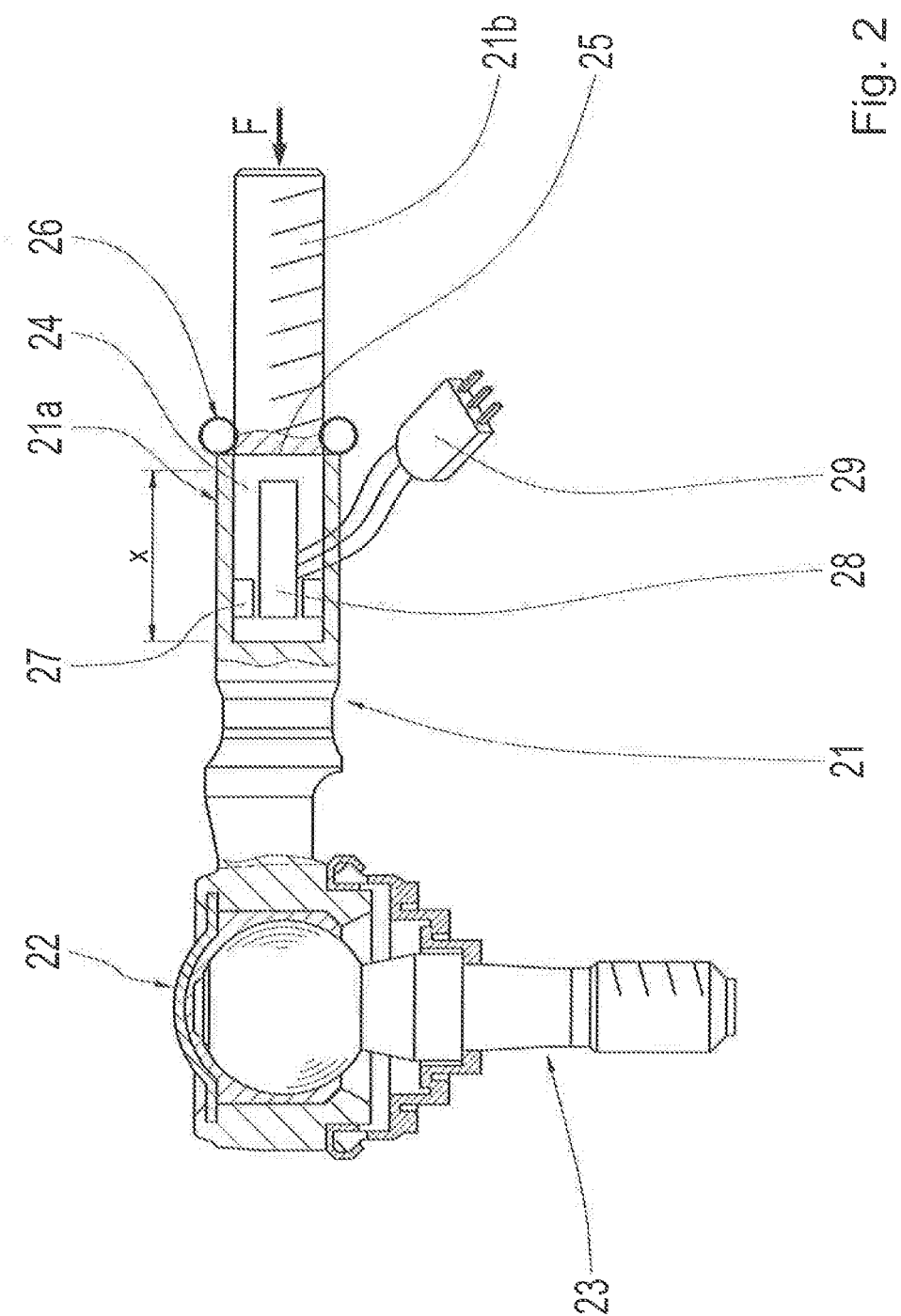

MECHANICAL COMPONENT HAVING A FORCE SENSOR

This application is a National Stage completion of PCT/EP2015/074085 filed Oct. 19, 2015, which claims priority from German patent application serial no. 10 2014 223 654.1 filed Nov. 20, 2014.

FIELD OF THE INVENTION

The invention relates to a mechanical component for a vehicle, comprising a measurement region having a surface, and at least one force sensor associated with the measurement region for detecting a force to which the component is exposed.

BACKGROUND OF THE INVENTION

The earlier application of the Applicant with the application number DE 10 2013 213 672.2 discloses a mechanical component having a force sensor, wherein the mechanical component is formed in one preferred embodiment as a pendulum support and the force sensor is formed as a flexible deformation element, which is connected in a form-fitting manner to the pendulum support within a measurement region.

The deformation element acts as a means to intensify a mechanical stress in the rod-shaped pendulum support, in which tensile and compressive stresses principally occur. The compression or stretching of the pendulum support resulting from a compressive or tensile stress is conveyed to the curved shaped deformation element and produces a bending, by which means the stretching or compression is intensified. The mechanical change of the deformation element, which is produced from a magnetic material, is associated with a change in the magnetic field, which is measurable and which can be converted into electrical signals. The deformation of the deformation element is detected by means of suitable sensor technology, preferably with realization of a magnetic field measurement.

Document DE 10 2011 117 519 A1 disclosed a trailer coupling with a force sensor, wherein the force sensor is preferably formed as a strain gauge and is disposed on the surface of the coupling hook.

SUMMARY OF THE INVENTION

The problem addressed by the present invention is to exploit further potential for the measurement of force on mechanical components.

The problem addressed by the invention is solved by means of the features and advantageous embodiments described below.

According to the invention it is envisaged that a mechanical component comprises, disposed in the measurement region, a hollow body with a cavity in which the force sensor can be positioned. This has the advantage that the sensitive force sensor is protected against harmful external influences, in particular stone chipping and corrosive media, because it is disposed and attached in a cavity which is hermetically sealed to the outside. Furthermore, this design also makes it possible to save on additional installation space for housing the sensor. The hollow body is an integral constituent of the component and is thus stressed in the same way as the rest of the component, i.e., the hollow body lies in the flux of force of the force to which the component is exposed. The component itself experiences no functional impairment resulting from the arrangement and integration of the hollow body.

According to an advantageous embodiment, the component is formed as a control arm or rod support or pendulum support or as a ball joint of a chassis, wherein the component is subject to tensile or compressive stress and is connected in an articulated manner to a stabilizer. The protected arrangement of the force sensor inside the pendulum support provides particular advantages in this application, namely due to the risk of stone chipping and corrosion. The measurement of the supporting force in the pendulum support is used as an output variable for active roll stabilization of the vehicle.

According to another preferred embodiment, the component is formed as a ball stud connected in an articulated manner to the pendulum support. By contrast to the pendulum support, the ball stud, and in particular its shaft, is subject to bending stress, i.e., bending stress occurs in the ball stud which is higher in terms of amount than the tensile or compressive stress in the pendulum support. In this respect, an intensification effect and thus a more precise measurement result are obtained in the case of an arrangement of the force sensor in a cavity of the ball stud. The pendulum support at least partially forms the housing for the ball stud, which can be housed therein in a rotatably and/or pivotally mobile manner.

According to another preferred embodiment, the component can be formed as a trailer coupling of a vehicle, i.e., as a coupling hook with a ball head. Here too, the protected arrangement of the force sensor inside a hollow body, which is part of the coupling hook, proves to be particularly advantageous.

According to another preferred embodiment, the hollow body is formed as a hollow cylinder or hollow ball with an inner surface. The force sensor—or even multiple force sensors—can be attached on the inner surface, and specifically in such a way that the deformations of the inner surface are directly conveyed to the force sensor or force sensors.

According to another preferred embodiment, the hollow body has at least one interface with the component, or with the pendulum support or the ball stud. The interface forms an opening on the hollow body and thus provides the opportunity for mounting of the force sensor and any accessories such as contacts, electronics, etc. Once the force sensor is placed in the cavity and attached, the hollow body and the component are fitted together at the interface.

According to another preferred embodiment, the hollow body is connected in the region of the interface to the component in a bonded manner, in particular by means of welding. A strong and tight connection between the hollow body and the component is thus obtained, i.e., a hermetic sealing of the force sensor, which provides protection from external influences, such as corrosion, for example.

According to another preferred embodiment, the hollow body has a closed cross section, in particular an annular section, which is disposed in the flux of force of the force to which the component is exposed (stress force). The cross-sectional area plays a decisive role in the resulting stressing and deformation.

According to another preferred embodiment, the force sensor is disposed in the region of the inner surface. The force sensor is connected—depending on the design—to the surface in such a way that the deformations occurring in the course of the stressing are conveyed directly to the force sensor.

According to another preferred embodiment, the force sensor can be formed as a strain gauge, in particular as an optical or sprayed-on or vapor-deposited strain gauge. The strain gauge is preferably applied by means of cathode sputtering (sputtering technique). A standardized force sensor can thus be used. However, it is also possible to use other force sensors, e.g., carbon nanotubes, which are used as a sensitive element which is applied to the inner surface of the hollow body. A detailed description of carbon nanotubes as force sensors can be found in the Applicant's application, submitted in the same period of time, with the internal file reference: ZF 006408. In addition, the measurement of the force can be realized in an inductive, resistive, optical, magnetostrictive, capacitive, piezoelectric or magnetoresistive manner.

BRIEF DESCRIPTION OF THE DRAWINGS

Exemplary embodiments of the invention are depicted in the drawings and are described in greater detail below, and additional features and/or advantages may emerge from the description and/or the drawings, in which FIG. 2 shows, as a second exemplary embodiment of the invention, a force sensor disposed inside a component formed as a pendulum support.

DETAILED DESCRIPTION OF THE PREFERRED EMBODIMENTS

Figure 1:
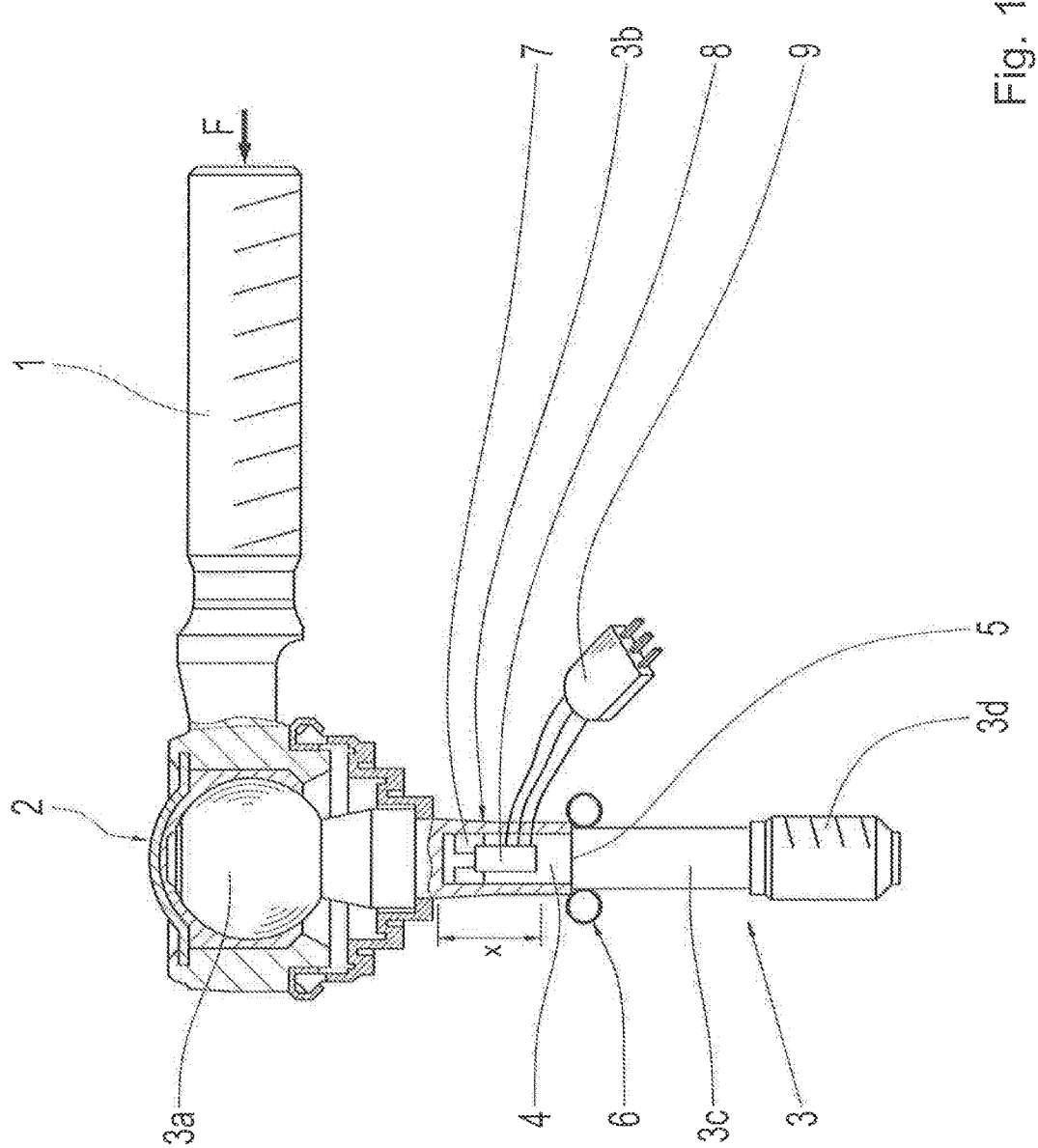
FIG. 1 shows, as a first exemplary embodiment of the invention, a force sensor disposed inside a component formed as a ball stud

FIG. 1 shows, as a first exemplary embodiment of the invention, an incompletely depicted pendulum support 1, which is connected by means of a ball joint 2 to a ball stud 3. The pendulum support 1 and the ball stud 3 can be components of a roll stabilization system of a vehicle. The ball stud 3, which constitutes the first exemplary embodiment of the mechanical component, has a ball head 3a, a first shaft region 3b and a second shaft region 3c with a threaded section 3d. The first shaft region 3b is formed partially hollow and has an approximately cylindrically formed cavity 4. The second solidly formed shaft region 3c is connected by means of an interface 5 to the first shaft region 3b in a bonded manner, preferably by means of a weld seam 6. The cavity 4 is thus sealed to the outside. Inside the cavity 4, which has an inner cylindrically-formed surface, at least one force sensor 7 is disposed, e.g., a strain gauge or a sensor element consisting of carbon nanotubes (in this regard, refer to the Applicant's application, submitted in the same period of time, with the internal file reference: ZF 006408). Furthermore, an electronic component 8 is disposed in the cavity 4, which electronic component is in an operative connection with the at least one force sensor 7. The electronic component 8 is connected by means of an electrical connection 9 to a not depicted power source.

The at least one force sensor 7 serves to measure the supporting force, indicated by an arrow F, in the pendulum support 1. The supporting force F is conveyed by means of the ball joint 2 to the ball stud 3 which is clamped by means of the threaded section 3d, so that the ball stud 3, in particular the first and second shaft regions 3b, 3c, is subject to a bending stress. The bending stress constitutes an intensification of the compressive or tensile stress acting on the pendulum support. The deformations resulting from the bending stress in the first shaft region 3b, in particular on the inner surface of the cavity 4, are measured by means of the at least one force sensor 7. The signal resulting from the measurement is supplied to the electronics of the electronic component 8 and evaluated there. The supporting force in the pendulum support 1 can be calculated from the bending stress and the measured deformation value.

In the depicted exemplary embodiment, the cavity 4 is cylindrical and the first shaft region 3b is depicted as a hollow cylinder. However, geometric differences in the cavity 4 are also possible: e.g., the first shaft region 3b can be formed spherical or barrel-shaped with a correspondingly enlarged cavity 4. This would provide the advantage that more space would be available on the inside for housing the sensors and the electronics.

FIG. 2 shows, as a second exemplary embodiment of the invention, a mechanical component, which is formed as a pendulum support 21 and which is connected by means of a ball joint 22 to a ball stud 23. The reference numerals for identical or similar parts are increased in FIG. 2 by an amount of 20 compared with the reference numerals in FIG. 1. The difference compared with FIG. 1 is that the at least one force sensor 27 is disposed in a cavity 24 of the pendulum support 21, which is stressed by means of the axial force F. The pendulum support 21 is divided by means of an interface 25 into a first hollow formed region 21a and a second solidly formed part 21b. Before the assembling, the cavity 24 is open in the region of the interface 25 and accessible from the outside, so that the at least one force sensor 27 and the electronic component 28 and the electrical plug 29 can be mounted and attached in the cavity 24. Both regions 21a, 21b are subsequently joined at the interface 25 and are connected to one another in a strong and tight manner, preferably by means of bonding, e.g. by means of a weld seam 26, so that the cavity 24 is closed and sealed to the outside. The axial force F is conveyed by means of the welded joint 26 in the region of the interface 25.

The cavity 24 is delimited by an annular section. This annular section is stressed by means of the axial force F, so that a compressive stress, associated with an elastic compression of the material, is formed there. In a similar manner, a tensile force with corresponding tensile stressing and stretching is possible during operation of the pendulum support. These deformations are detected by means of the at least one force sensor 27.

By contrast with the depictions in FIG. 1 and FIG. 2, the invention can also be applied to other similarly constructed components, e.g., in a vehicle trailer coupling. In this case, the coupling hook of the trailer coupling would have to be partially formed as a hollow body, in which at least one force sensor could be placed in order to detect the forces acting on the coupling hook.

REFERENCE NUMERALS 1 pendulum support
2 ball joint
3 ball stud
3a ball head
3b first shaft region
3c second shaft region
3d threaded section
4 cavity
5 interface
6 weld seam
7 force sensor
8 electronic component
9 plug
21 pendulum support 21a first region (hollow)
21b second region (solid)
22 ball joint
23 ball stud
24 cavity
25 interface
26 weld seam
27 force sensor
28 electronic component
29 plug
F supporting force
x measurement region

The invention claimed is:

1. A mechanical component for a vehicle, the mechanical component comprising:
    first and second axial shaft regions, the first shaft region having a hollow body that has a cylindrical inner surface that defines a cavity, and the hollow body having an axial end that forms an axial end of the first shaft region,
    the first shaft region having a measurement region that extends axially, partially along the hollow body of the first shaft region,
    at least one force sensor being supported within the cavity by the inner surface of the hollow body such that the at least one force sensor is disposed within the measurement region for detecting a force to which the mechanical component is exposed, and the axial end of the hollow body contacting an axial end surface of the second shaft region such that the at least one force sensor is axially enclosed within the cavity.

2. The mechanical component according to claim 1, wherein the mechanical component is formed as a pendulum support of a chassis.

3. The mechanical component according to claim 1, wherein the mechanical component is formed as either a ball joint or a ball stud which is connected, in an articulated manner, to a pendulum support.

4. The mechanical component according to claim 1, wherein the mechanical component is formed as a trailer coupling with a coupling hook.

5. The mechanical component according to claim 1, wherein the hollow body is formed as either a hollow cylinder or a hollow ball with the inner surface.

6. The mechanical component according to claim 1, wherein the axial end of the hollow body has at least one interface with the axial end surface of the second axial shaft region, and the axial end surface of the second shaft region sealing the at least one force sensor within the cavity.

7. The mechanical component according to claim 6, wherein the axial end of the hollow body is connected to the axial end surface of the second axial shaft region by a bond which seals the at least one force sensor within the cavity.

8. The mechanical component according to claim 1, wherein the hollow body has a closed cross section which is disposed in a flux of force of the force.

9. The mechanical component according to claim 5, wherein the at least one force sensor measuring deformations of the inner surface of the hollow body which result from bending stress in the first shaft region.

10. The mechanical component according to claim 1, wherein the at least one force sensor is formed either as a strain gauge or a sensor element made of carbon nanotubes.

11. A mechanical component for a vehicle, the mechanical component being one of a rod support, a pendulum support, a control arm and a ball joint, and the mechanical component defining an axis and comprising:
    first and second axial shaft regions, the first shaft region having an axial first end and an axially opposite remote end, a cavity extends from the first end of the first shaft region partially through the first shaft region, and the cavity forming a hollow body having a cylindrical inner surface,
    the first shaft region having a measurement region,
    at least one force sensor being supported on the inner surface of the hollow body and axially arranged within the measurement region for detecting a force to which the mechanical component is exposed, and
    the second shaft region being a solid shaft having an axial end that is fixed to the first end of the first shaft region such that the at least one force sensor is enclosed within the cavity in the first shaft region.

12. The mechanical component according to claim 11, wherein the first and the second shaft regions being coaxially aligned, and the axial end of the second shaft region being welded to the first end of the first shaft region such that an end surface of the axial end of the second shaft region closes the cavity and seals the at least one force sensor within the cavity.

13. The mechanical component according to claim 11, wherein the remote end of the first shaft region comprises a ball head of a ball joint, the at least one force sensor measuring supporting forces that are applied on the mechanical component by way of the ball head.

14. The mechanical component according to claim 11, wherein the first shaft region and the second shaft region being formed independent of each other, and the axial end of the second shaft region being fixed to the first end of the first shaft region such that the cavity is radially delimited by the inner surface of the hollow body and the cavity is axially delimited by the axial end of the second shaft region and a radially aligned surface arranged in the first shaft region at an axial end of the measurement region.

* * * * *